United States Patent
Norton et al.

(10) Patent No.: US 6,378,548 B1
(45) Date of Patent: Apr. 30, 2002

(54) VARYING SIZE DIAPHRAGM VALVE ASSEMBLIES UTILIZING DIAPHRAGM OF UNIFORM SIZE

(75) Inventors: Larry A. Norton, Elkhorn; Gary Lee Ferguson, Mylton, both of WI (US)

(73) Assignee: United Dominion Industries, Inc., Charlotte, NC (US)

( * ) Notice: Subject to any disclaimer, the term of this patent is extended or adjusted under 35 U.S.C. 154(b) by 0 days.

(21) Appl. No.: 09/602,845

(22) Filed: Jun. 23, 2000

Related U.S. Application Data
(60) Provisional application No. 60/208,267, filed on May 31, 2000.

(51) Int. Cl.[7] .............................................. F16K 31/00
(52) U.S. Cl. ..................... 137/271; 251/335.2; 251/291
(58) Field of Search ....................... 137/271; 251/335.2, 251/291

(56) References Cited

U.S. PATENT DOCUMENTS

| | | | |
|---|---|---|---|
| 40,939 A | 12/1863 | Leitch | |
| 2,504,057 A | 4/1950 | Trefil | |
| 2,653,788 A | 9/1953 | Svabeck, Jr. | |
| 2,654,561 A | 10/1953 | Trefil | |
| 2,665,105 A | 1/1954 | Svabeck, Jr. | |
| 2,702,686 A | 2/1955 | Fortune | |
| 2,784,934 A | 3/1957 | Paulius, Jr. et al. | |
| 2,905,433 A | 9/1959 | Till et al. | |
| 3,868,969 A | * 3/1975 | Schwenk | 137/625.5 |
| 4,750,709 A | * 6/1988 | Kolenc et al. | 251/335.2 |
| 4,760,862 A | * 8/1988 | Mutou et al. | 137/315 |
| 4,760,990 A | * 8/1988 | Kerger et al. | 251/335.2 |
| 5,228,472 A | 7/1993 | Ougiya et al. | |
| 5,669,596 A | * 9/1997 | Yoshikawa et al. | 251/335.2 |
| 5,743,513 A | * 4/1998 | Yoshikawa et al. | 251/335.2 |
| 5,771,884 A | 6/1998 | Yarnall et al. | |
| 5,823,509 A | * 10/1998 | Daniels | 251/335.2 |
| 5,865,423 A | * 2/1999 | Barber et al. | 251/335.2 |
| 5,881,997 A | 3/1999 | Ogawa et al. | |
| 5,954,086 A | 9/1999 | Ronchi | |
| 6,145,810 A | * 11/2000 | Connolly et al. | 251/331 |
| 6,216,731 B1 | * 4/2001 | Frenkel | 137/556 |

* cited by examiner

Primary Examiner—John Rivell
Assistant Examiner—Meredith Schoenfeld
(74) Attorney, Agent, or Firm—Baker & Hostetler LLP

(57) ABSTRACT

A diaphragm valve assembly includes a valve housing having two or more fluid ports and defining both a valve chamber extending therebetween for fluid flow therethrough and an access port leading into the valve chamber. A bonnet covers the access port and defines an opening therein through which a valve stem arrangement extends. The valve stem arrangement includes a valve seat disposed within the valve chamber. The valve stem arrangement is slidable through the opening in the bonnet between a first position, wherein the valve seat is disposed in sealing engagement with a fluid port to thereby define a closed position of the valve assembly, and a second position, wherein the valve seat is disengaged from the first fluid port to thereby define an open position of the valve assembly. A diaphragm surrounds and is attached to the valve stem arrangement to form a seal therewith. A bonnet insert is disposed about the diaphragm adjacent to the valve housing, and it is directly exposed to fluid flowing through the valve chamber. A clamp forcibly retains the bonnet to the valve housing and retains the bonnet insert between the bonnet and the valve housing. The diaphragm forms a seal with an inner portion of the bonnet insert, and an outer portion of the bonnet insert forms a seal with the valve housing. The bonnet insert and the diaphragm together thereby prevent fluid flowing through the valve chamber from escaping into the access port between the valve housing and the valve stem arrangement.

19 Claims, 4 Drawing Sheets

VARYING SIZE DIAPHRAGM VALVE ASSEMBLIES UTILIZING DIAPHRAGM OF UNIFORM SIZE

This application claims benefit of Provisional No. 60/208,267 filed May 31, 2000.

FIELD OF THE PRESENT INVENTION

The present invention relates to the field of diaphragm valve assemblies and, in particular, to diaphragm valve assemblies each varying in size but utilizing a diaphragm of a uniform size.

BACKGROUND OF THE PRESENT INVENTION

A conventional diaphragm valve assembly includes a valve housing having two fluid ports (a fluid inlet and a fluid outlet) and defining a valve chamber extending therebetween for fluid flow through the valve housing. The valve housing further includes an access port leading into the valve chamber. A bonnet covers the access port and includes an opening defined therein through which a valve stem arrangement slidably extends. The valve stem arrangement, in turn, includes a valve seat movably disposed between first and second positions within the valve chamber for sealing engagement with a fluid port in the first position (thereby defining a closed position of the valve assembly) and non-sealing engagement therewith in the second position (thereby defining an open position of the valve assembly).

As is conventional, a diaphragm is attached to and extends between the valve stem arrangement and the peripheral edge of the access port to seal the valve chamber from the access port. In particular, the diaphragm is retained in place by the disposition of its peripheral edge between the bonnet and the valve housing, the bonnet being clamped or otherwise forcibly retained in engagement with the valve housing by a bonnet nut, clamp, etc. In this conventional design, the valve stem arrangement and the diaphragm are exposed to the valve chamber and, in particular, to fluid flow therethrough, and together the valve stem arrangement and diaphragm effectively prevent fluid from leaking into and/or through the access port.

Examples of conventional diaphragm valves are disclosed in U.S. Pat. Nods. 5,954,086; 5,881,997; 5,771,884; 5,228,472; 4,750,709; 2,905,433; 2,784,934; 2,702,686; 2,665,105; 2,654,561; 2,653,788; 2,504,057; and 40,939. As disclosed in each of these references, the diaphragm completely covers and seals the valve chamber from the access port between the valve stem arrangement and the valve housing defining the valve chamber and fluid ports.

As a result of this conventional design for diaphragm valve assemblies, a change in the size of the fluid port necessitates a change in the size of the valve seat, which in turn leads to a change in the size of the access port through which the valve seat is inserted. This necessitates a change in the size of the diaphragm that covers and seals the valve chamber from the access port between the valve stem arrangement and the valve housing. As will therefore be appreciated by one having ordinary skill in the art, a number of varying sizes of parts must be manufactured and maintained in order to provide for varying sizes of diaphragm valve assemblies.

Accordingly, it is an object of the present invention to simplify the manufacturing and maintenance of diaphragm valve assemblies of varying sizes.

SUMMARY OF THE PRESENT INVENTION

Briefly summarized, the diaphragm valve assembly of the present invention includes a valve housing having two fluid ports and defining both a valve chamber extending therebetween for fluid flow therethrough and an access port leading into the valve chamber. A bonnet covers the access port and defines an opening therein through which a valve stem arrangement extends. The valve stem arrangement includes a valve seat disposed within the valve chamber. The valve stem arrangement is slidable through the opening in the bonnet between a first position, wherein the valve seat is disposed in sealing engagement with a fluid port to thereby define a closed position of the valve assembly, and a second position, wherein the valve seat is disengaged from the first fluid port to thereby define an open position of the valve assembly. A diaphragm surrounds and is attached to the valve stem arrangement to form a seal therewith. In accordance with the present invention, the diaphragm valve assembly further includes a bonnet insert disposed about the diaphragm adjacent to the valve housing. The diaphragm forms a seal with an inner portion of the bonnet insert, and an outer portion of the bonnet insert forms a seal with the valve housing. The bonnet insert and the diaphragm together thereby prevent fluid flowing through the valve chamber from escaping into the access port between the valve housing and the valve stem arrangement.

In features of the present invention, the bonnet insert is directly exposed to fluid flowing through the valve chamber; an outer portion of the diaphragm is secured between the bonnet and the bonnet insert; an outer portion of the bonnet insert is secured between the bonnet and the valve housing; a clamp forcibly retains the bonnet to the valve housing; and the clamp retains the bonnet insert between the bonnet and the valve housing.

The present invention also includes the combination of two of the aforesaid diaphragm valve assemblies wherein the access ports are of different sizes but the diaphragms are identical in size. In features of this combination, the openings in the bonnet inserts are also identical in size; the bonnet inserts include inner diameters identical in size; and the vale stem arrangements include contoured diaphragm support members having identical contours.

BRIEF DESCRIPTION OF THE DRAWINGS

Preferred embodiments of the present invention will now be described in detail with reference to the accompanying drawings, wherein.

DETAILED DESCRIPTION OF PREFERRED EMBODIMENTS

Figure 1:
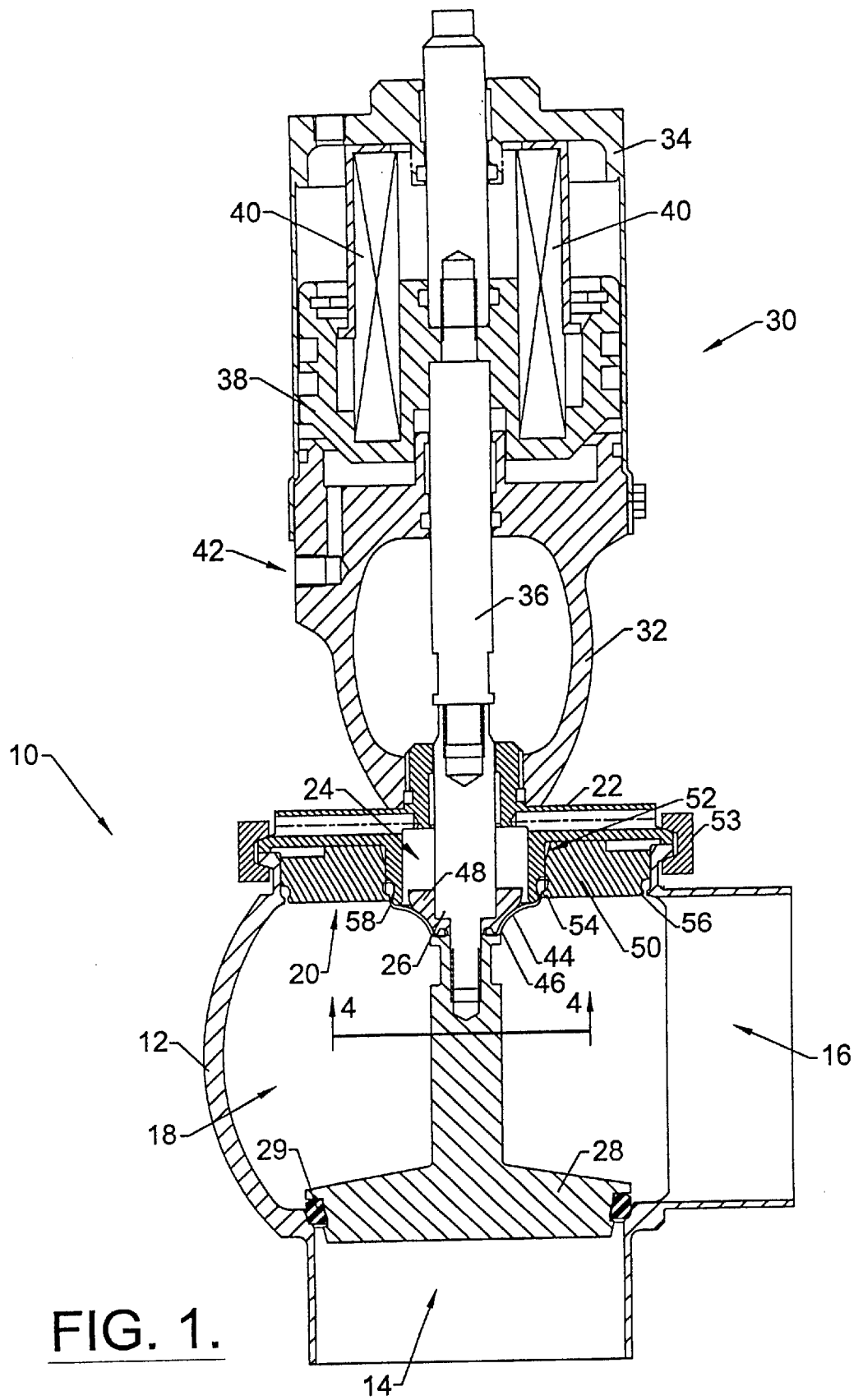
FIG. 1 is an elevational view in cross-section of a first embodiment of a diaphragm valve assembly in accordance with the present invention.

Preferred embodiments of the present invention will now be described in detail with reference to the Drawings, wherein like structures between the various embodiments are identified by like reference numerals.

A first diaphragm valve assembly 10 of the present invention is illustrated in FIG. 1 and includes a valve housing 12 having two fluid ports 14,16 and defining a valve chamber 18 extending therebetween for fluid flow therethrough. The valve housing 12 further defines an access port 20 leading into the valve chamber 18. A bonnet 22 covers the access port 20 and defines an opening 24 therein through which a valve stem arrangement 26 extends.

The valve stem arrangement 26 includes a valve seat 28 secured thereon and disposed within the valve chamber 18. The valve stem arrangement 26 is slidable through the opening 24 in the bonnet 22 between a first position, wherein an o-ring seal 29 disposed on the valve seat 28 sealing engages a first fluid port 14 to thereby define a closed position of the valve assembly 10, and a second position (not shown), wherein the valve seat 28 is disengaged from the first fluid port 14 to thereby define an open position of the valve assembly 10.

Movement of the valve seat 28 between the first and second positions is controlled by a conventional pneumatic valve actuator 30 including a yoke 32, cylinder arrangement 34, stem arrangement 36, piston 38, and spring 40. The valve assembly is opened by injecting compressed air into the actuator 30 through an air port 42 on the side opposing the spring 40 thereby causing the valve seat 28 to disengage from the first fluid port 14.

A diaphragm 44 surrounds and is attached at an inner portion 46 thereof to the valve stem arrangement 26 to form a seal therewith. The valve stem arrangement 26 further includes a contoured support member 48 which engages and supports the diaphragm 44 when the valve assembly 10 is closed.

In accordance with the present invention, the diaphragm valve assembly 10 further includes a bonnet insert 50 disposed about the diaphragm 44 adjacent to the valve housing 12. In particular, the bonnet insert 50 includes an inner opening 52 through which the bonnet 22 extends. The diaphragm 44 forms a seal with an inner portion 54 of the bonnet insert 50, and an outer portion 56 of the bonnet insert 50 forms a seal with the valve housing 12. Specifically, the outer portion 56 of the bonnet insert 50 is secured between the bonnet 22 and the valve housing 12 by a bead, and an outer portion 58 of the diaphragm 44 is secured between the bonnet 22 and the bonnet insert 50 by another bead. A clamp 53 forcibly retains the bonnet 22 to the valve housing 12 and retains the bonnet insert 50 between the bonnet 22 and the valve housing 12.

As will therefore be apparent, the bonnet insert 50 is directly exposed to fluid flowing through the valve chamber 12 and is not, itself, covered by the diaphragm 44. The bonnet insert 50 and the diaphragm 44 together thereby prevent fluid flowing through the valve chamber 12 from escaping into and/or through the access port 20 between the valve housing 12 and the valve stem arrangement 26.

Figure 2:
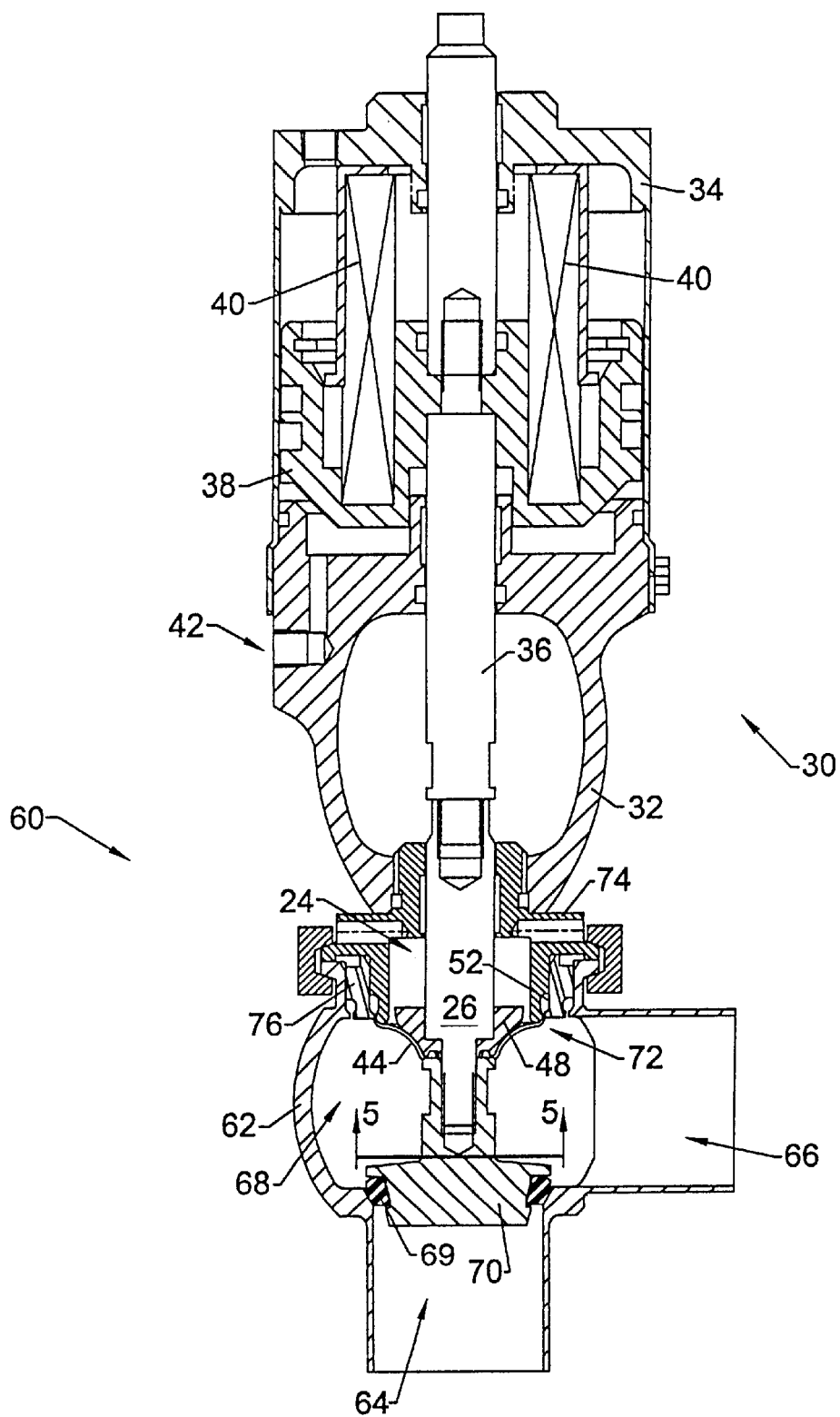
FIG. 2 is an elevational view in cross-section of a second embodiment of a diaphragm valve assembly in accordance with the present invention.
Figure 3:
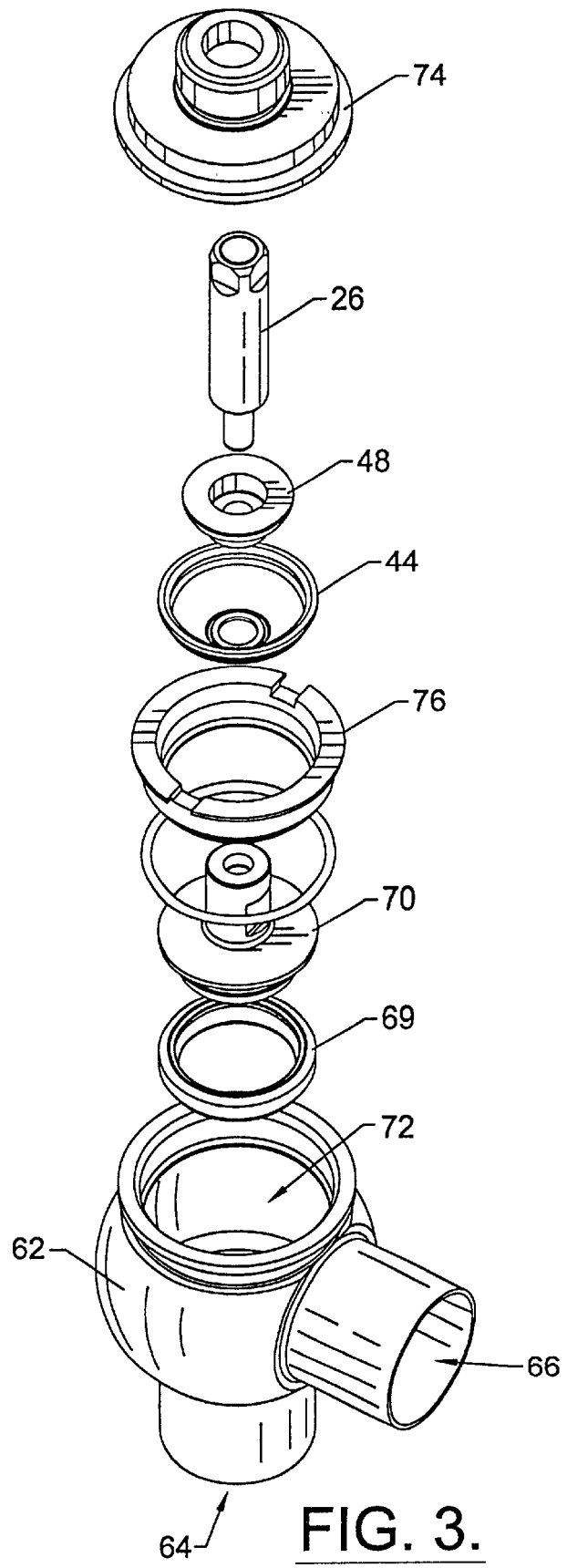
FIG. 3 is an exploded view of the diaphragm valve assembly of FIG. 2.

A second diaphragm valve assembly 60 is shown in FIG. 2, and the components thereof, excluding the pneumatic valve actuator 30, are illustrated in exploded view in FIG. 3. The diaphragm valve assembly 60 includes the same design as that of the first diaphragm valve assembly 10 shown in FIG. 1, but varies in size to that of FIG. 1. In particular, the valve assembly 60 generally is smaller, in that it includes a smaller valve housing 62 having smaller fluid ports 64,66 and defining a smaller valve chamber 68. Furthermore, because the first fluid port 64 is smaller, the corresponding o-ring seal 69 and valve seat 70, which close fluid flow through the first fluid port 64, are smaller. The corresponding access port 72 defined by the valve housing 62 is likewise smaller and, subsequently, the bonnet 74 and bonnet insert 76 are each smaller. However, in accordance with the present invention, the diaphragm 44 remains the same size and does not differ from that of the diaphragm valve assembly 10 of FIG. 1. The corresponding contoured support member 48 of the valve stem arrangement 26 also remains the same, as does the opening 24 defined by the bonnet 74 and the inner opening 52 of the bonnet insert 76. Accordingly, the same diaphragm 44 is utilized in either diaphragm valve assembly 10,60, together with the same contour support member 48 and the same pneumatic valve actuator 30.

Figure 4:
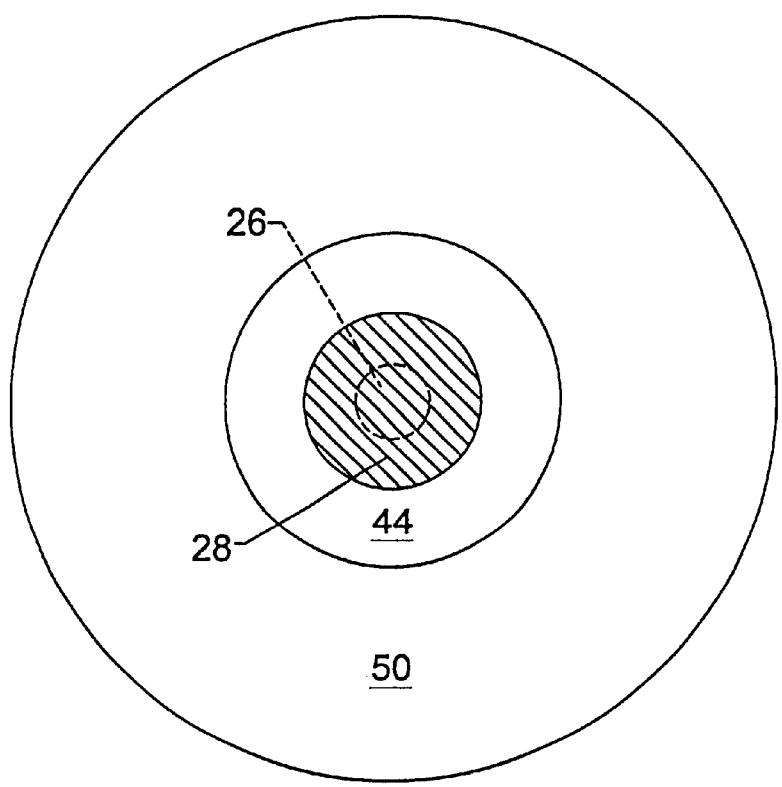
FIG. 4 is a schematic illustration of a bottom view of a portion of the diaphragm valve assembly of FIG. 1 taken along the line 4—4.
Figure 5:
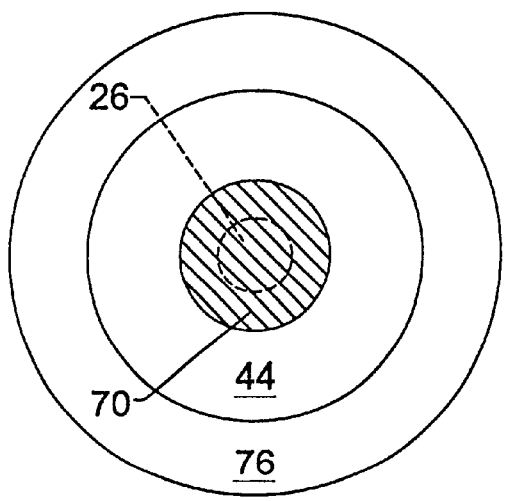
FIG. 5 is a schematic illustration of a bottom view of a portion of the diaphragm valve assembly of FIG. 2 taken along the line 5—5.

The comparison between the two diaphragm valve assemblies 10,60 is emphasized by contrasting FIG. 4 with FIG. 5 in which the view along line 4—4 and along line 5—5 are respectively illustrated. As will be apparent, the decrease in the size of the access port in transitioning from valve assembly 10 to valve assembly 60 is compensated for by decreasing the overall diameter of the bonnet insert without altering the diaphragm itself. This is possible because the diaphragm and the bonnet insert, together, prevent fluid from escaping through the port access. Otherwise, if only the diaphragm served this function, then alteration of the access port would necessarily require alteration of the diaphragm to compensate therefor.

As will now be apparent to an ordinary artisan, the present invention enables diaphragms of a uniform size to be utilized in diaphragm valve assemblies of different sizes. Furthermore, it will also be recognized that the ability to utilize a relatively smaller size diaphragm than what would otherwise be required under conventional design reduces the stress and consequent wear that is experienced by larger sized diaphragms found in larger sized diaphragm valve assemblies.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor to be construed to limit the present invention or otherwise to exclude any such other embodiments, adaptations, variations, modifications and equivalent arrangements, the present invention being limited only by the claims appended hereto and the equivalents thereof.

What is claimed is:

1. A diaphragm valve assembly, comprising:
   a valve housing having two fluid ports and defining both a valve chamber extending therebetween for fluid flow therethrough and an access port leading into said valve chamber;
   a bonnet covering said access port and defining an opening therein;
   a valve stem arrangement extending through said opening in said bonnet, said valve stem arrangement including a valve seat disposed within said valve chamber, said valve stem arrangement being slidable through said opening between a first position, wherein said valve seat is disposed in sealing engagement with a said fluid port to thereby define a closed position of the valve assembly, and a second position wherein said valve seat is disengaged from said first fluid port to thereby define an open position of the valve assembly;

a diaphragm surrounding and attached to said valve stem arrangement to form a seal therewith; and a bonnet insert disposed about said diaphragm adjacent to said valve housing within said access port, said diaphragm forming a seal with an inner portion of said bonnet insert, and an outer portion of said bonnet insert forming a seal with said valve housing, said bonnet insert and said diaphragm thereby preventing fluid flowing through said valve chamber from escaping into said access port between said valve housing and said valve stem arrangement, wherein said bonnet insert is directly exposed to fluid flowing through said valve chamber.

2. A diaphragm valve assembly comprising:

a valve housing having two fluid ports and defining both a valve chamber extending therebetween for fluid flow therethrough and an access port leading into said valve chamber;

a bonnet covering said access port and defining an opening therein;

a valve stem arrangement extending through said opening in said bonnet, said valve stem arrangement including a valve seat disposed within said valve chamber, said valve stem arrangement being slidable through said opening between a first position, wherein said valve seat is disposed in sealing engagement with a said fluid port to thereby define a closed position of the valve assembly, and a second position wherein said valve seat is disengaged from said first fluid port to thereby define an open position of the valve assembly;

a diaphragm surrounding and attached to said valve stem arrangement to form a seal therewith; and a bonnet insert disposed about said diaphragm adjacent to said valve housing within said access port, said diaphragm forming a seal with an inner portion of said bonnet insert, and an outer portion of said bonnet insert forming a seal with said valve housing, said bonnet insert and said diaphragm thereby preventing fluid flowing through said valve chamber from escaping into said access port between said valve housing and said valve stem arrangement, wherein an outer portion of said diaphragm is secured between said bonnet and said bonnet insert.

3. A diaphragm valve assembly comprising:

a valve housing having two fluid ports and defining both a valve chamber extending therebetween for fluid flow therethrough and an access port leading into said valve chamber;

a bonnet covering said access port and defining an opening therein;

a valve stem arrangement extending through said opening in said bonnet, said valve stem arrangement including a valve seat disposed within said valve chamber, said valve stem arrangement being slidable through said opening between a first position, wherein said valve seat is disposed in sealing engagement with a said fluid port to thereby define a closed position of the valve assembly, and a second position wherein said valve seat is disengaged from said first fluid port to thereby define an open position of the valve assembly;

a diaphragm surrounding and attached to said valve stem arrangement to form a seal therewith; and a bonnet insert disposed about said diaphragm adjacent to said valve housing within said access port, said diaphragm forming a seal with an inner portion of said bonnet insert, and an outer portion of said bonnet insert forming a seal with said valve housing, said bonnet insert and said diaphragm thereby preventing fluid flowing through said valve chamber from escaping into said access port between said valve housing and said valve stem arrangement, wherein an outer portion of said bonnet insert is secured between said bonnet and said valve housing.

4. A diaphragm valve assembly comprising:

a valve housing having two fluid ports and defining both a valve chamber extending therebetween for fluid flow therethrough and an access port leading into said valve chamber;

a bonnet covering said access port and defining an opening therein, wherein a clamp forcibly retains said bonnet to said valve housing;

a valve stem arrangement extending through said opening in said bonnet, said valve stem arrangement including a valve seat disposed within said valve chamber, said valve stem arrangement being slidable through said opening between a first position, wherein said valve seat is disposed in sealing engagement with a said fluid port to thereby define a closed position of the valve assembly, and a second position wherein said valve seat is disengaged from said first fluid port to thereby define an open position of the valve assembly;

a diaphragm surrounding and attached to said valve stem arrangement to form a seal therewith; and a bonnet insert disposed about said diaphragm adjacent to said valve housing within said access port, said diaphragm forming a seal with an inner portion of said bonnet insert, and an outer portion of said bonnet insert forming a seal with said valve housing, said bonnet insert and said diaphragm thereby preventing fluid flowing through said valve chamber from escaping into said access port between said valve housing and said valve stem arrangement.

5. The diaphragm valve assembly of claim 4, wherein said clamp retains said bonnet insert between said bonnet and said valve housing.

6. A combination of two diaphragm valve assemblies, including:

(a) a first diaphragm valve assembly, comprising,
  (i) a valve housing having two fluid ports and defining both a valve chamber extending therebetween for fluid flow therethrough and an access port leading into said valve chamber;
  (ii) a bonnet covering said access port and defining an opening therein;
  (iii) a valve stem arrangement extending through said opening in said bonnet, said valve stem arrangement including a valve seat disposed within said valve chamber, said valve stem arrangement being slidable through said opening between a first position, wherein said valve seat is disposed in sealing engagement with a said fluid port to thereby define a closed position of the valve assembly, and a second position wherein said valve seat is disengaged from said first fluid port to thereby define an open position of the valve assembly;

(iv) a diaphragm surrounding and attached to said valve stem arrangement to form a seal therewith; and (v) a bonnet insert disposed about said diaphragm adjacent to said valve housing within said access port, said diaphragm forming a seal with an inner portion of said bonnet insert and an outer portion of said bonnet insert forming a seal with said valve housing, said bonnet insert and said diaphragm thereby preventing fluid flowing through said valve chamber from escaping into said access port between said valve housing and said valve stem arrangement;

(b) a second diaphragm valve assembly, comprising, (i) a valve housing having two fluid ports and defining both a valve chamber extending therebetween for fluid flow therethrough and an access port leading into said valve chamber;

(ii) a bonnet covering said access port and defining an opening therein;

(iii) a valve stem arrangement extending through said opening in said bonnet, said valve stem arrangement including a valve seat disposed within said valve chamber, said valve stem arrangement being slidable through said opening between a first position, wherein said valve seat is disposed in sealing engagement with a said fluid port to thereby define a closed position of the valve assembly, and a second position wherein said valve seat is disengaged from said first fluid port to thereby define an open position of the valve assembly;

(iv) a diaphragm surrounding and attached to said valve stem arrangement to form a seal therewith; and (v) a bonnet insert disposed about said diaphragm adjacent to said valve housing within said access port, said diaphragm forming a seal with an inner portion of said bonnet insert and an outer portion of said bonnet insert forming a seal with said valve housing, said bonnet insert and said diaphragm thereby preventing fluid flowing through said valve chamber from escaping into said access port between said valve housing and said valve stem arrangement;

(c) wherein said access port of said first diaphragm valve assembly is larger in diameter than that of said access port of said second diaphragm valve assembly, but said diaphragm of said first diaphragm valve assembly is identical in size to said diaphragm of said second diaphragm valve assembly.

7. The diaphragm valve assemblies of claim 6, wherein said bonnet insert of each said first and second diaphragm valve assembly is directly exposed to fluid flow through said respective valve chamber.

8. The diaphragm valve assemblies of claim 6, wherein said opening in said bonnet of said first diaphragm valve assembly is identical in size to said opening in said bonnet of said second diaphragm valve assembly.

9. The diaphragm valve assemblies of claim 6, wherein said bonnet insert of said first diaphragm valve assembly includes an inner opening that is identical in size to that of said bonnet insert of said second diaphragm valve assembly.

10. The diaphragm valve assemblies of claim 6, wherein said valve stem arrangement of said first diaphragm valve assembly includes a contoured diaphragm support member identical in contour to a contoured diaphragm support member of said valve stem arrangement of said second diaphragm valve assembly.

11. A method for preventing fluid flowing through a valve chamber from escaping into an access port of a diaphragm valve assembly having a valve housing, a valve chamber, a bonnet, and a stem arrangement, comprising the steps of:

sealing the valve stem arrangement, by attaching a diaphragm to the valve stem arrangement and surrounding the valve stem arrangement with the diaphragm; and disposing a bonnet insert about the diaphragm adjacent to the valve housing so that the diaphragm forms a seal with an inner portion of the bonnet insert and an outer portion of the bonnet insert forms a seal with the valve housing, wherein the bonnet insert is directly exposed to fluid flowing through the valve chamber.

12. A method for preventing fluid flowing through a valve chamber from escaping into an access port of a diaphragm valve assembly having a valve housing, a valve chamber, a bonnet, and a stem arrangement, comprising the steps of:

sealing the valve stem arrangement, by attaching a diaphragm to the valve stem arrangement and surrounding the valve stem arrangement with the diaphragm; and disposing a bonnet insert about the diaphragm adjacent to the valve housing so that the diaphragm forms a seal with an inner portion of the bonnet insert and an outer portion of the bonnet insert forms a seal with the valve housing, wherein the outer portion of the diaphragm is secured between the bonnet and said bonnet insert.

13. A method for preventing fluid flowing through a valve chamber from escaping into an access port of a diaphragm valve assembly having a valve housing, a valve chamber, a bonnet, and a stem arrangement, comprising the steps of:

sealing the valve stem arrangement, by attaching a diaphragm to the valve stem arrangement and surrounding the valve stem arrangement with the diaphragm; and disposing a bonnet insert about the diaphragm adjacent to the valve housing so that the diaphragm forms a seal with an inner portion of the bonnet insert and an outer portion of the bonnet insert forms a seal with the valve housing, wherein the outer portion of the bonnet insert is secured between the bonnet and the valve housing.

14. A method for preventing fluid flowing through a valve chamber from escaping into an access port of a diaphragm valve assembly having a valve housing, a valve chamber, a bonnet, and a stem arrangement, comprising the steps of:

retaining the bonnet to the valve housing forcibly with a clamp;

sealing the valve stem arrangement, by attaching a diaphragm to the valve stem arrangement and surrounding the valve stem arrangement with the diaphragm; and disposing a bonnet insert about the diaphragm adjacent to the valve housing so that the diaphragm forms a seal with an inner portion of the bonnet insert and an outer portion of the bonnet insert forms a seal with the valve housing.

15. The method of claim 14, wherein the clamp retains the bonnet insert between the bonnet and the valve housing.

16. A diaphragm valve assembly, comprising:

a valve housing having two fluid ports and defining both a valve chamber extending therebetween for fluid flow therethrough and an access port leading into said valve chamber;

means for covering said access port and defining an opening therein;

a valve stem arrangement extending through said opening in said covering means, said valve stem arrangement including a valve seat disposed within said valve chamber, said valve stem arrangement being slidable through said opening between a first position, wherein said valve seat is disposed in sealing engagement with a said fluid port to thereby define a closed position of the valve assembly, and a second position wherein said valve seat is disengaged from said first fluid port to thereby define an open position of the valve assembly;

sealing means surrounding and attached to said valve stem arrangement to form a seal therewith; and a bonnet insert disposed about said sealing means adjacent to said valve housing within said access port, said sealing means forming a seal with an inner portion of said bonnet insert, and an outer portion of said bonnet insert forming a seal with said valve housing, said bonnet insert and said sealing means thereby preventing fluid flowing through said valve chamber from escaping into said access port between said valve housing and said valve stem arrangement, wherein said bonnet insert is directly exposed to fluid flowing through said chamber.

17. A diaphragm valve assembly comprising:

a valve housing having two fluid ports and defining both a valve chamber extending therebetween for fluid flow therethrough and an access port leading into said valve chamber;

means for covering said access port and defining an opening therein;

a valve stem arrangement extending through said opening in said covering means, said valve stem arrangement including a valve seat disposed within said valve chamber, said valve stem arrangement being slidable through said opening between a first position, wherein said valve seat is disposed in sealing engagement with a said fluid port to thereby define a closed position of the valve assembly, and a second position wherein said valve seat is disengaged from said first fluid port to thereby define an open position of the valve assembly;

means for surrounding and attached to said valve stem arrangement to form a seal therewith, wherein an outer portion of said sealing means is secured between said covering means and said bonnet insert; and a bonnet insert disposed about said sealing means adjacent to said valve housing within said access port, said sealing means forming a seal with an inner portion of said bonnet insert, and an outer portion of said bonnet insert forming a seal with said valve housing, said bonnet insert and said sealing means thereby preventing fluid flowing through said valve chamber from escaping into said access port between said valve housing and said valve stem arrangement.

18. A diaphragm valve assembly comprising:

a valve housing having two fluid ports and defining both a valve chamber extending therebetween for fluid flow therethrough and an access port leading into said valve chamber;

means for covering said access port and defining an opening therein;

a valve stem arrangement extending through said opening in said covering means, said valve stem arrangement including a valve seat disposed within said valve chamber, said valve stem arrangement being slidable through said opening between a first position, wherein said valve seat is disposed in sealing engagement with a said fluid port to thereby define a closed position of the valve assembly, and a second position wherein said valve seat is disengaged from said first fluid port to thereby define an open position of the valve assembly;

means for surrounding and attached to said valve stem arrangement to form a seal therewith; and a bonnet insert disposed about said sealing means adjacent to said valve housing within said access port, said sealing means forming a seal with an inner portion of said bonnet insert, and an outer portion of said bonnet insert forming a seal with said valve housing, said bonnet insert and said sealing means thereby preventing fluid flowing through said valve chamber from escaping into said access port between said valve housing and said valve stem arrangement, wherein an outer portion of said bonnet insert is secured between said covering means and said valve housing.

19. A diaphragm valve assembly comprising:

a valve housing having two fluid ports and defining both a valve chamber extending therebetween for fluid flow therethrough and an access port leading into said valve chamber;

means for covering said access port and defining an opening therein, wherein a clamp forcibly retains said covering means to said valve housing;

a valve stem arrangement extending through said opening in said covering means, said valve stem arrangement including a valve seat disposed within said valve chamber, said valve stem arrangement being slidable through said opening between a first position, wherein said valve seat is disposed in sealing engagement with a said fluid port to thereby define a closed position of the valve assembly, and a second position wherein said valve seat is disengaged from said first fluid port to thereby define an open position of the valve assembly;

means for surrounding and attached to said valve stem arrangement to form a seal therewith; and a bonnet insert disposed about said covering means adjacent to said valve housing within said access port, said covering means forming a seal with an inner portion of said bonnet insert, and an outer portion of said bonnet insert forming a seal with said valve housing, said bonnet insert and said sealing means thereby preventing fluid flowing through said valve chamber from escaping into said access port between said valve housing and said valve stem arrangement.

* * * * *

UNITED STATES PATENT AND TRADEMARK OFFICE
CERTIFICATE OF CORRECTION

PATENT NO. : 6,378,548 B1
DATED : April 30, 2002
INVENTOR(S) : Larry A. Norton et al.

It is certified that error appears in the above-identified patent and that said Letters Patent is hereby corrected as shown below:

<u>Title page,</u>
Item [75], Inventors: change second inventor's city from "Mylton" to -- Milton --.

Signed and Sealed this

Fifteenth Day of October, 2002

Attest:

JAMES E. ROGAN
Attesting Officer
Director of the United States Patent and Trademark Office